(12) United States Patent
Malczenko et al.

(10) Patent No.: US 12,117,289 B2
(45) Date of Patent: Oct. 15, 2024

(54) BUMP CHECK TOOL FOR GAS TURBINE ROTOR

(71) Applicant: General Electric Company, Schenectady, NY (US)

(72) Inventors: Jakub Malczenko, Masovian (PL); Łukasz Sajdak, Masovian (PL); Piotr Wojciechowski, Masovian (PL); Krzysztof Manowski, Masovian (PL)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/344,399

(22) Filed: Jun. 29, 2023

(65) Prior Publication Data
US 2024/0035799 A1 Feb. 1, 2024

(30) Foreign Application Priority Data
Jul. 28, 2022 (PL) .......................................... 441859

(51) Int. Cl.
*G01B 5/14* (2006.01)

(52) U.S. Cl.
CPC ....................................... *G01B 5/14* (2013.01)

(58) Field of Classification Search
CPC . G01B 5/14; F01D 25/285; F01D 5/06; F01D 21/003; F16C 19/386; F01C 21/102; F04C 27/00
See application file for complete search history.

(56) References Cited

U.S. PATENT DOCUMENTS

| 4,170,058 | A  | * | 10/1979 | Leffler | H02K 5/161 310/90 |
| 5,203,673 | A  | * | 4/1993  | Evans   | F01D 11/22 415/173.2 |
| 10,352,299 | B2 | * | 7/2019  | Booth   | F03D 17/00 |
| 10,718,227 | B2 | * | 7/2020  | Kim     | F16C 25/02 |
| 2009/0289620 | A1 | * | 11/2009 | Suckling | F01D 21/003 324/207.16 |
| 2021/0040862 | A1 | * | 2/2021  | Kim     | F01D 25/168 |
| 2021/0040863 | A1 | * | 2/2021  | Kim     | F04D 29/0513 |

FOREIGN PATENT DOCUMENTS

| JP | H0545106 | A  | * | 2/1993  |
| JP | 2000045962 | A  | * | 2/2000  |
| JP | 2002317603 | A  | * | 10/2002 |
| KR | 200469267 | Y1 | * | 10/2013 |

* cited by examiner

*Primary Examiner* — Octavia Hollington
(74) *Attorney, Agent, or Firm* — Eversheds Sutherland (US) LLP

(57) ABSTRACT

The present application provides a bump check tool for determining a clearance between a shim of a thrust bearing and a rotor flange of a rotor shaft within a casing of a gas turbine engine. The bump check tool includes a hydraulic cylinder, a connection plate attached to the hydraulic cylinder and positioned about the rotor shaft and a support frame supporting the hydraulic cylinder and attached to the casing. The hydraulic cylinder drives the connection plate and the rotor shaft to determine the clearance between the shim of the thrust bearing and the rotor flange of the rotor shaft.

20 Claims, 2 Drawing Sheets

BUMP CHECK TOOL FOR GAS TURBINE ROTOR

CROSS-REFERENCE TO RELATED APPLICATIONS

This application claims priority pursuant to 35 U.S.C. 119(a) to Polish Application No. P.441859, filed Jul. 28, 2022, which application is incorporated herein by reference in its entirety.

TECHNICAL FIELD

The present application and the resultant patent relate generally to gas turbine engines and more particularly relate to a bump check tool to check the clearance between a shim of a thrust bearing and a rotor flange of a rotor shaft without disassembly of the turbine casing.

BACKGROUND OF THE INVENTION

Gas turbine engines typically include a compressor, a combustor, a turbine, and an external load such as a generator. A rotor shaft transfers power and rotary motion from the turbine to both the compressor and the external load. The rotor shaft may be supported longitudinally using a number of bearing assemblies such a thrust bearing assembly. The thrust bearing assembly supports the rotor shaft and minimizes axial and radial movement. The thrust bearings may be equipped with a number of shims that are rubbed during standard gas turbine operation. The shims thus must be replaced regularly.

A "bump check" test may be required while servicing the gas turbine thrust bearings. Before disassembly of the thrust bearings, the clearance between the shims of the thrust bearings and the rotor flange of the rotor shaft should to be measured. In order to so, the rotor has to be pushed forward and backward to measure the distance between the two critical positions. The name "bump check" relates to the noise one can hear when the rotor flange hits the thrust bearings. Currently known methods of performing a bump check test are time consuming in that the upper half of the turbine casing generally must be removed.

SUMMARY OF THE INVENTION

The present application and the resultant patent provide a bump check tool for determining a clearance between a shim of a thrust bearing and a rotor flange of a rotor shaft within a casing of a gas turbine engine. The bump check tool includes a hydraulic cylinder, a connection plate attached to the hydraulic cylinder and positioned about the rotor shaft, and a support frame supporting the hydraulic cylinder and attached to the casing. The hydraulic cylinder drives the connection plate and the rotor shaft to determine the clearance between the shim of the thrust bearing and the rotor flange of the rotor shaft.

The present application and the resultant patent further provide a method of performing a bump check test on a rotor shaft of a turbine engine. The method may include the steps of attaching a bump check tool to a casing of the turbine engine with the casing intact, moving the rotor shaft of the turbine engine with a hydraulic cylinder of the bump check tool, determining a clearance between a shim of a thrust bearing and a rotor flange of the rotor shaft, and removing the bump check tool from the casing.

The present application and the resultant patent further provide a bump check tool for determining a clearance between a shim of a thrust bearing and a rotor flange of a rotor shaft within a casing of a turbine engine. The bump test tool may include a hydraulic cylinder to push and pull the rotor shaft, a connection plate attached to a piston of the hydraulic cylinder and positioned about the rotor shaft, and a support frame supporting the hydraulic cylinder and attached to the casing by a number of mounting bolts. The hydraulic cylinder drives the connection plate and the rotor shaft to determine the clearance between the shim of the thrust bearing and the rotor flange of the rotor shaft.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
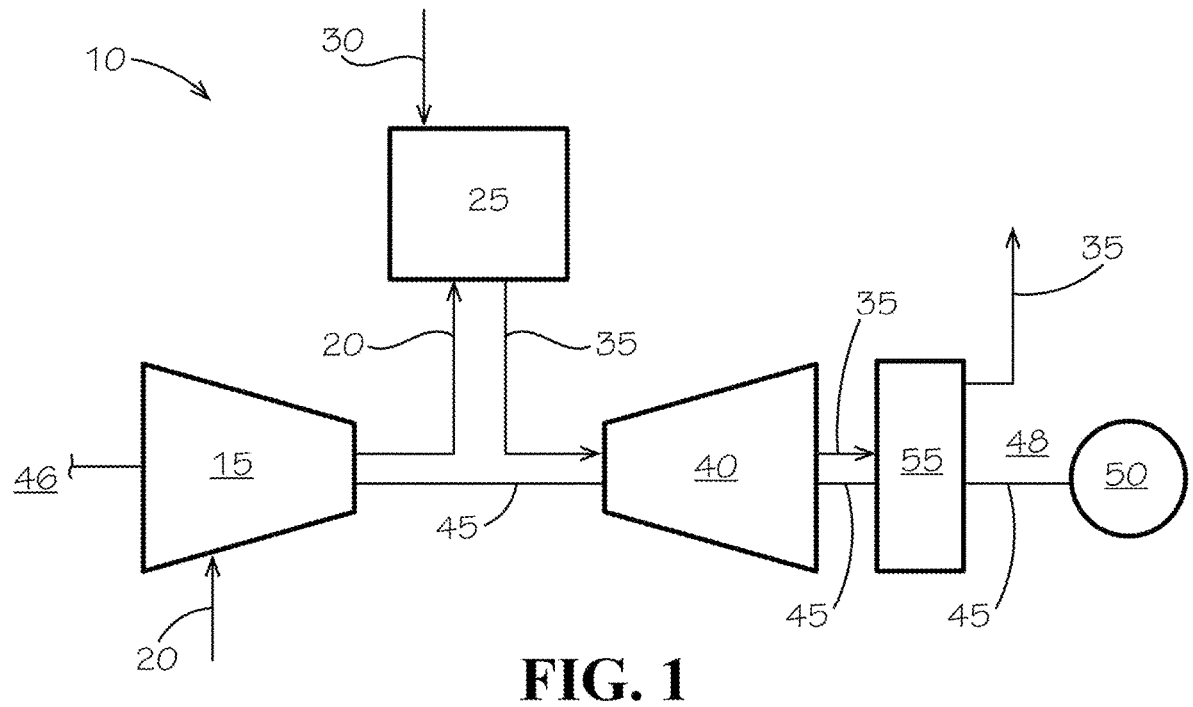
FIG. 1 is a schematic diagram of a gas turbine engine including a compressor, a combustor, a turbine, a rotor shaft extending therethrough, an exhaust frame, and an external load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 so as to produce mechanical work. The mechanical work produced in the turbine 40 drives the compressor 15 via a rotor shaft 45 and an external load 50 such as an electrical generator and the like. The rotor shaft 45 may extend from a forward end 46 to an aft end 48.

The flow of combustion gases 35 is delivered from the turbine 40 to an exhaust frame 55 positioned downstream thereof. The exhaust frame 55 may contain and direct the flow of combustion gases 35 to other components of the gas turbine engine 10. For example, the exhaust frame 55 may direct the flow of combustion gases 35 to an exhaust plenum or an exhaust diffuser. Other configurations and other components may be used herein.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
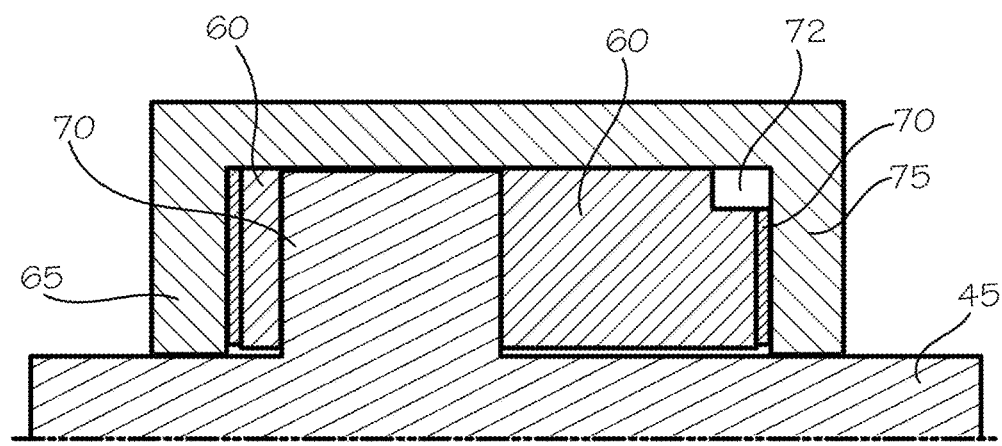
FIG. 2 is partial sectional view of the rotor shaft, the rotor flange, the thrust bearings, and the shims as may be used with the gas turbine engine of FIG. 1.

As is shown in FIG. 2, the rotor shaft 45 may be supported by a number of thrust bearings 60 and the like. Specifically, a number of thrust bearings 60 may be positioned about a flange 65 of the rotor shaft 45. The thrust bearings 60 each may have one or more shims 70 positioned thereon. The position of the thrust bearings 60 and the shims 70 with respect to the rotor flange 65 may be determined via an internal bearing sensor 72 and the like. As described above, current methods of measuring the clearance between the shims 70 of the thrust bearings 60 and the rotor flange 65 require removal of the upper half of the turbine casing 75. Such removal was an expensive and time consuming process.

Figure 3:
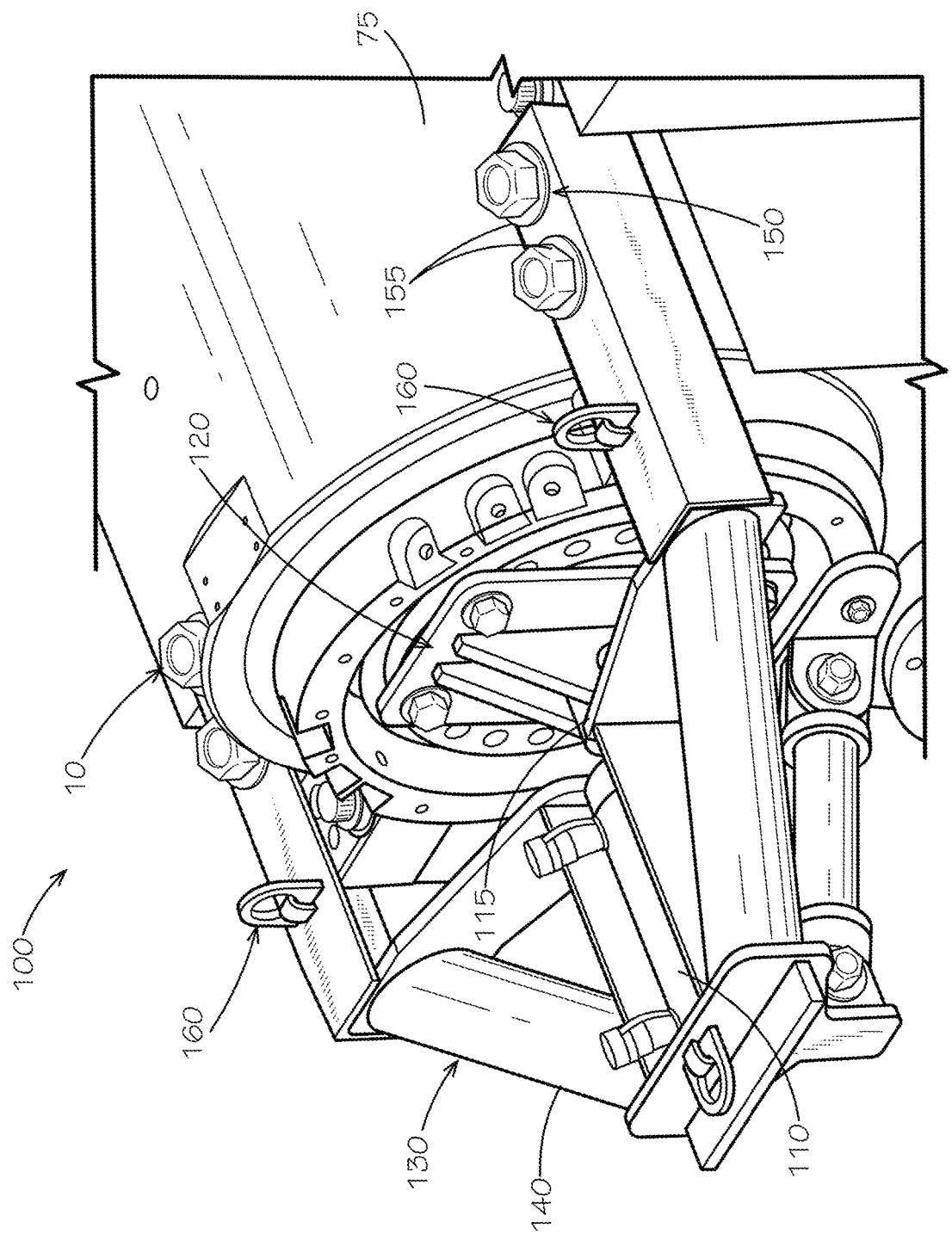
FIG. 3 is a perspective view of a bump check tool as may be described herein for use with the rotor shaft of the gas turbine engine of FIG. 1.

FIG. 3 shows an example of a bump check tool 100 as may be described herein. The bump check tool 100 may include a hydraulic cylinder 110. The hydraulic cylinder 110 may be a conventional double action cylinder and the like. The hydraulic cylinder 110 may be powered by a hand pump or other type of compressed fluid source. The hydraulic cylinder 110 may include a piston 115. The hydraulic cylinder 110 may drive a tool-shaft connection plate 120 via the piston 115. The tool-shaft connection plate 120 may be largely flat and sized according to the diameter of the rotor shaft 45. Other components and other configurations may be used herein.

The hydraulic cylinder 110 may be supported by a support frame 130. The support frame 130 may include any number of substantially rigid frame support member 140. The frame support members 140 may be sized to support the anticipated force generated by the hydraulic cylinder 110 and the anticipated size of the rotor shaft 45 and the turbine casing 75. The support frame 130 may be bolted to the casing 75 via mounting bolts 150 or attached otherwise. One or more welded load rings 160 may be welded or attached otherwise to the frame support members 140. The bump check tool 100 may be attached to the forward end 46, the aft end 48, or to both ends of the rotor shaft 45. The frame support members 140 may be bolted to existing bolt holes 155 in the casing 75 or attached otherwise. Other components and other configurations may be used herein.

In use, the bump check tool 100 may be lifted into place about the rotor shaft 45 of the gas turbine engine 10. The support frame 130 may be bolted or otherwise attached to the casing 75 or other structure of the gas turbine engine 10 with the connection plate 120 positioned about the rotor shaft 45 near the forward thrust bearings 60. The hydraulic cylinder 110 of the bump check tool 100 pushes and pulls the rotor shaft 45 to check and measure the clearance between the shims 70 of the thrust bearings 60 and the rotor flange 65 of the rotor shaft 45. Movement of the rotor shaft 45 may be limited to only a few millimeters forward and backward. Movement of the rotor shaft 45 may be determined by analog or digital means such as a dial indicator on the casing 75 or the internal bearing sensor 72. One can hear a "bump" when the rotor flange 65 hits the thrust bearings 60. After performing the test, the bump check tool 100 may be detached from the rotor shaft 45 and the casing 75.

The bump check test is on the critical path and should be accomplished as soon as possible. The bump check tool 100 described herein thus does not require removal of the upper half of the turbine casing 75. Rather, both half of the turbine casing 75 may remain connected and intact. Moreover, the savings in time and expense in using the bump check tool 100 may be considerable, perhaps more than twenty hours per unit per outage. Additionally, the bump check tool 100 may be attached directly to the turbine casing 75 which provides accessibility across a number of different gas turbine models and configurations.

Further aspects of this invention are provided by the subject matter of the following clauses:

A bump check tool for determining a clearance between a shim of a thrust bearing and a rotor flange of a rotor shaft within a casing of a gas turbine engine, comprising: a hydraulic cylinder; a connection plate attached to the hydraulic cylinder and positioned about the rotor shaft; and a support frame supporting the hydraulic cylinder and attached to the casing; wherein the hydraulic cylinder drives the connection plate and the rotor shaft to determine the clearance between the shim of the thrust bearing and the rotor flange of the rotor shaft.

The bump check tool of the preceding clause, wherein the hydraulic cylinder is a double action hydraulic cylinder.

The bump check tool of any of the preceding clauses, wherein the hydraulic cylinder pushes and pulls the rotor shaft.

The bump check tool of any of the preceding clauses, wherein the hydraulic cylinder is hand operated.

The bump check tool of any of the preceding clauses, wherein the hydraulic cylinder drives the connection plate with a piston.

The bump check tool of any of the preceding clauses, wherein the support frame comprises a plurality of support members.

The bump check tool of any of the preceding clauses, wherein the support frame is attached to the casing via a plurality of mounting bolts.

The bump check tool of any of the preceding clauses, wherein the casing comprises bolt holes therein for the plurality of mounting bolts.

The bump check tool of any of the preceding clauses, wherein the support frame comprises a plurality of load rings thereon.

The bump check tool of any of the preceding clauses, further comprising a bearing sensor to determine the clearance between the shim and the rotor flange.

The bump check tool of any of the preceding clauses, wherein the bump check tool is positioned about a forward end of the rotor shaft.

The bump check tool of any of the preceding clauses, wherein the bump check tool is positioned about an aft end of the rotor shaft.

The bump check tool of any of the preceding clauses, wherein the bump check tool is attached to the casing with the casing intact.

The bump check tool of any of the preceding clauses, wherein the bump check tool is detachable from the casing.

A method of performing a bump check test on a rotor shaft of a turbine engine, comprising: attaching a bump check tool to a casing of the turbine engine with the casing intact; moving the rotor shaft of the turbine engine with a hydraulic cylinder of the bump check tool; determining a clearance between a shim of a thrust bearing and a rotor flange of the rotor shaft; and removing the bump check tool from the casing.

A bump check tool for determining a clearance between a shim of a thrust bearing and a rotor flange of a rotor shaft within a casing of a turbine engine, comprising: a hydraulic cylinder to push and pull the rotor shaft; a connection plate attached to a piston of the hydraulic cylinder and positioned about the rotor shaft; and a support frame supporting the hydraulic cylinder and attached to the casing by a plurality of mounting bolt; wherein the hydraulic cylinder drives the connection plate and the rotor shaft to determine the clearance between the shim of the thrust bearing and the rotor flange of the rotor shaft.

The bump check tool of the preceding clause, wherein the hydraulic cylinder is a double action hydraulic cylinder.

The bump check tool of any of the preceding clauses, wherein the support frame comprises a plurality of support members.

The bump check tool of any of the preceding clauses, wherein the support frame comprises a plurality of load rings thereon.

The bump check tool of any of the preceding clauses, further comprising a bearing sensor to determine the clearance between the shim and the rotor flange.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. A bump check tool for determining an axial clearance between a shim of a thrust bearing and a rotor flange of a rotor shaft within a casing of a gas turbine engine, comprising:
    a hydraulic cylinder;
    a connection plate attached to the hydraulic cylinder and positioned about the rotor shaft; and
    a support frame supporting the hydraulic cylinder and attached to the casing;
    wherein the hydraulic cylinder drives the connection plate and the rotor shaft to determine the axial clearance between the shim of the thrust bearing and the rotor flange of the rotor shaft.

2. The bump check tool of claim 1, wherein the hydraulic cylinder is a double action hydraulic cylinder.

3. The bump check tool of claim 1, wherein the hydraulic cylinder pushes and pulls the rotor shaft.

4. The bump check tool of claim 1, wherein the hydraulic cylinder is hand operated.

5. The bump check tool of claim 1, wherein the hydraulic cylinder drives the connection plate with a piston.

6. The bump check tool of claim 1, wherein the support frame comprises a plurality of support members.

7. The bump check tool of claim 1, wherein the support frame is attached to the casing via a plurality of mounting bolts.

8. The bump check tool of claim 7, wherein the casing comprises bolt holes therein for the plurality of mounting bolts.

9. The bump check tool of claim 1, wherein the support frame comprises a plurality of load rings thereon.

10. The bump check tool of claim 1, further comprising a bearing sensor to determine the clearance between the shim and the rotor flange.

11. The bump check tool of claim 1, wherein the bump check tool is positioned about a forward end of the rotor shaft.

12. The bump check tool of claim 1, wherein the bump check tool is positioned about an aft end of the rotor shaft.

13. The bump check tool of claim 1, wherein the bump check tool is attached to the casing with the casing intact.

14. The bump check tool of claim 1, wherein the bump check tool is detachable from the casing.

15. A method of performing a bump check test on a rotor shaft of a turbine engine, comprising:
    attaching a bump check tool to a casing of the turbine engine with the casing intact;
    wherein the bump check tool comprises a connection plate and a support frame;
    moving the rotor shaft of the turbine engine with a hydraulic cylinder of the bump check tool;
    determining an axial clearance between a shim of a thrust bearing and a rotor flange of the rotor shaft; and
    removing the bump check tool from the casing.

16. A bump check tool for determining an axial clearance between a shim of a thrust bearing and a rotor flange of a rotor shaft within a casing of a turbine engine, comprising:
    a hydraulic cylinder to push and pull the rotor shaft;
    a connection plate attached to a piston of the hydraulic cylinder and positioned about the rotor shaft; and
    a support frame supporting the hydraulic cylinder and attached to the casing by a plurality of mounting bolts;
    wherein the hydraulic cylinder drives the connection plate and the rotor shaft to determine the axial clearance between the shim of the thrust bearing and the rotor flange of the rotor shaft.

17. The bump check tool of claim 16, wherein the hydraulic cylinder is a double-action hydraulic cylinder.

18. The bump check tool of claim 16, wherein the support frame comprises a plurality of support members.

19. The bump check tool of claim 16, wherein the support frame comprises a plurality of load rings thereon.

20. The bump check tool of claim 16, further comprising a bearing sensor to determine the clearance between the shim and the rotor flange.

* * * * *